(12) United States Patent
Kondo et al.

(10) Patent No.: US 10,018,377 B2
(45) Date of Patent: Jul. 10, 2018

(54) SOLAR LIGHT (HEAT) ABSORPTION MATERIAL AND HEAT ABSORPTION/ACCUMULATION MATERIAL AND SOLAR LIGHT (HEAT) ABSORPTION/CONTROL BUILDING COMPONENT USING THE SAME

(71) Applicants: University of the Ryukyus, Okinawa (JP); Osaka Gas Co., Ltd., Osaka (JP)

(72) Inventors: Yoshikazu Kondo, Okinawa (JP); Masami Ueno, Okinawa (JP); Yoshinobu Kawamitsu, Okinawa (JP); Junichiro Tsutsumi, Okinawa (JP)

(73) Assignees: University of the Ryukyus, Okinawa (JP); Osaka Gas Co., Ltd., Osaka (JP)

( * ) Notice: Subject to any disclaimer, the term of this patent is extended or adjusted under 35 U.S.C. 154(b) by 94 days.

(21) Appl. No.: 14/464,205

(22) Filed: Aug. 20, 2014

(65) Prior Publication Data
US 2014/0352237 A1 Dec. 4, 2014

Related U.S. Application Data

(63) Continuation of application No. 13/254,345, filed as application No. PCT/JP2010/053624 on Mar. 5, 2010.

(30) Foreign Application Priority Data

Mar. 6, 2009 (JP) ................................ 2009-053818
Nov. 4, 2009 (JP) ................................ 2009-252587

(51) Int. Cl.
*C09K 5/10* (2006.01)
*F24J 2/04* (2006.01)
(Continued)

(52) U.S. Cl.
CPC .............. *F24J 2/0422* (2013.01); *C09K 5/10* (2013.01); *F24J 2/0455* (2013.01); *F24J 2/34* (2013.01);
(Continued)

(58) Field of Classification Search
CPC .................................. F42J 2/0422; C09K 5/10
See application file for complete search history.

(56) References Cited

U.S. PATENT DOCUMENTS 1,951,403 A * 3/1934 Goddard .................... F24J 2/07
122/32
4,047,518 A 9/1977 Anderson
(Continued)

FOREIGN PATENT DOCUMENTS

AU  2007203187 A1  2/2008
CA  2239883 A1  10/1996
(Continued)

*Primary Examiner* — Aileen B Felton
(74) *Attorney, Agent, or Firm* — The Webb Law Firm

(57) ABSTRACT

A solar light (heat) absorption material which has an excellent solar light (heat) absorbing ability and a simple structure, and may be used as a low-cost and high-performance heat absorption/accumulation material. Also, a solar light (heat) absorption/control building component including the solar light (heat) absorption material that allows for easy change of its solar light (heat) absorption/control ability. The material includes particles dispersed into a liquid medium having a specific heat ranging from 0.4 to 1.4 cal/g/° C. and a melting point of 5° C. or lower. The dispersed particles have L*value of 30 or less as determined by the CIE-Lab color system (light source D65).

4 Claims, 8 Drawing Sheets

(51) Int. Cl.
*F24J 2/46* (2006.01)
*F24J 2/34* (2006.01)
*F24J 2/40* (2006.01)
*F24J 2/48* (2006.01)

(52) U.S. Cl.
CPC ............ *F24J 2/407* (2013.01); *F24J 2/4649* (2013.01); *F24J 2/48* (2013.01); *Y02A 30/272* (2018.01); *Y02B 10/20* (2013.01); *Y02B 10/24* (2013.01); *Y02E 10/44* (2013.01); *Y02E 10/46* (2013.01)

(56) References Cited

U.S. PATENT DOCUMENTS

| | | | |
|---|---|---|---|
| 4,221,210 | A | 9/1980 | Cvijanovich |
| 4,239,035 | A | 12/1980 | Brooks et al. |
| 4,283,914 | A * | 8/1981 | Allen ............... F03G 6/06 126/584 |
| 4,482,467 | A | 11/1984 | Nakamura et al. |
| 5,518,977 | A * | 5/1996 | Dunne et al. ............ 502/68 |
| 2005/0196336 | A1* | 9/2005 | Chatterjee et al. ......... 423/448 |
| 2006/0107993 | A1 | 5/2006 | Wilhelm Krokoszinski et al. |
| 2008/0197318 | A1 | 8/2008 | Morita et al. |
| 2009/0314281 | A1 | 12/2009 | Schaap |

FOREIGN PATENT DOCUMENTS

| | | | |
|---|---|---|---|
| DE | 19532993 | A1 | 3/1997 |
| FR | 2405444 | A1 | 5/1979 |
| FR | 2536159 | A1 | 5/1984 |
| GB | 2025030 | A | 1/1980 |
| JP | 5095832 | A | 7/1975 |
| JP | 58174486 | A | 10/1983 |
| JP | 6174677 | U | 5/1986 |
| JP | 450285 | A | 2/1992 |
| JP | 552427 | A | 3/1993 |
| JP | 6137688 | A | 5/1994 |
| JP | 7139819 | A | 6/1995 |
| JP | 11512173 | A | 10/1999 |
| JP | 2000502416 | A | 2/2000 |
| JP | 200088359 | A | 3/2000 |
| JP | 200199497 | A | 4/2001 |
| JP | 2001287291 | A | 10/2001 |
| JP | 200289972 | A | 3/2002 |
| JP | 2002517707 | A | 6/2002 |
| JP | 200465004 | A | 3/2004 |
| JP | 2004116964 | A | 4/2004 |
| JP | 2004176966 | A | 6/2004 |
| JP | 2005265251 | A | 9/2005 |
| JP | 3120001 | U | 3/2006 |
| JP | 2006144538 | A | 6/2006 |
| JP | 2006204206 | A | 8/2006 |
| JP | 2006214654 | A | 8/2006 |
| JP | 2006300492 | A | 11/2006 |
| JP | 2006336960 | A | 12/2006 |
| JP | 2006340675 | A | 12/2006 |
| JP | 200837733 | A | 2/2008 |
| JP | 2008133991 | A | 6/2008 |
| JP | 2008138899 | A | 6/2008 |
| JP | 2008201834 | A | 9/2008 |
| JP | 2008542681 | A | 11/2008 |
| JP | 2008297503 | A | 12/2008 |
| JP | 200945027 | A | 3/2009 |
| JP | 2009169252 | A | 7/2009 |
| WO | 9964795 | A2 | 12/1999 |
| WO | 2006059071 | A1 | 6/2006 |

* cited by examiner

Case-0
no heat collecting plate
(reference model)

Case-1
heat collecting plate set on
20 m² of roof face

Case-2
heat collecting plate set on
entire roof face

Case-3
heat collecting plates set on
roof face and east and west wall faces

SOLAR LIGHT (HEAT) ABSORPTION MATERIAL AND HEAT ABSORPTION/ACCUMULATION MATERIAL AND SOLAR LIGHT (HEAT) ABSORPTION/CONTROL BUILDING COMPONENT USING THE SAME

CROSS-REFERENCE TO RELATED APPLICATIONS

This application is a continuation application of U.S. patent application Ser. No. 13/254,345 filed on Mar. 5, 2010 which is the U.S. national phase of PCT Application No. PCT/JP2010/053624 filed on Mar. 5, 2010 and claims priority to Japanese Patent Application Nos. JP 2009-053818 and JP 2009-252587 filed on Mar. 6, 2009 and Nov. 4, 2009, respectively, the entire disclosures of which are incorporated herein by reference.

BACKGROUND OF THE INVENTION

Field of the Invention

The present invention relates to a solar light (heat) absorption material having excellent solar light (heat) absorption. More particularly, the invention relates to a heat absorption/accumulation material utilizing the solar light (heat) absorption material comprising a heat absorbent material and a heat accumulation material integrated together, thus achieving less heat loss from the heat absorption/accumulation material, so that the heat absorption/accumulation material has excellent solar heat-absorbing efficiency and relates also to a heat absorption/accumulation structure, a cooling system or a power generating system utilizing the heat absorption/accumulation material.

The invention also relates to a solar light (heat) absorption/control building component using the above-described solar light (heat) absorption material and having excellent ability to absorb/control solar light (heat), the solar light (heat) absorption/control building component allowing easy change in this absorption/control ability. The invention further relates to an agricultural/horticultural facility and a house/building using the inventive material.

Description of Related Art

Recently, the earth has been facing serious problems such as global warming, depletion of fossil fuels, etc. For sustainable development in future, there are high expectations for utilization of solar heat. As examples of solar heat utilization, there have been conventionally practiced converting water into hot water by a solar water heater. to be used directly for a shower or bathing, using heat thereof for generation of electricity, air cooling.

As some examples of solar water heater, there are known a tank-reserved type water heater including a heat collecting portion and a heat accumulating portion formed integral with each other, a natural circulation type including a heat collecting portion and a heat accumulating portion as separate portions and a forced circulation type water heater. Though differing in the operating principles thereof, the basic operational principle common to these water heaters resides in use of the solar heat absorption material (heat collecting plate) and transfer of an amount of heat collected therein to the heat accumulating portion (generally, water) to be accumulated therein. Conventionally, for solar water heaters, research has been done for the purpose of performance improvement thereof, to increase the absorbing efficiency for solar heat, to restrict heat loss from the heat collecting plate, to increase the temperature of the heat accumulating portion. On the other hand, reduction of the manufacturing cost has also been attempted.

Of the above-described aspects, the most focusing material of all is the solar heat absorption material. So far, there has been developed a black material which absorbs the light of 2.5 μm or less which is present more abundantly in the spectra (ultraviolet radiation, visible light, infrared radiation) of solar light reaching the earth surface, such as black-colored inorganic materials such as metal oxide such as chromium oxide (black chrome), nickel oxide (black nickel), copper oxide, zinc oxide, iron oxide, etc or organic substances (Patent Documents 1 through 4). However, all of these are expensive, thus going counter to the need for manufacturing cost restriction.

Further, in view of the fact that for elevating the temperature of the heat accumulating portion, the most effective measure is to increase the light collecting area for the solar light and to restrict heat loss from the heat accumulating plate; hence, various proposals have been made (Patent Documents 5 through 16).

However, all of these, based fundamentally on the same principle, have been unable to achieve performance improvement, cost reduction and downsizing of any significant degrees. That is, with those constructions of solar water heaters proposed so far, improvement of solar light absorbing efficiency and elevating the temperature of light collecting plate are essentially required for improvement of heat conductivity to the heat accumulating portion. However, when these measures are taken, there inevitably occurs increase of heat loss from the light collecting plate (blackbody radiations $\propto \sigma T^4$). In order to restrict this heat dissipation, it has been required to provide a selective absorption membrane, to evacuate the space where the light collecting plate is installed or to charge an amount of rare gas therein, these are inviting greater complexity, enlargement and cost increase of the apparatus.

As described above, with the conventional solar water heaters, greater complexity, size enlargement, use of special material, etc. have been required for improving performance and all of which lead to increase in the manufacture cost. For this reason, the conventional heaters have not been widely popularized.

On the other hand, for growth of plants, the light, temperature, humidity, nutrition, water, or appropriate stress such as wind, etc. are needed. In particular, the light and the temperature are significantly dependent upon the external environment and geographical factors, seasonal factors exert significant influences on the kinds and yields of plants that can be cultivated. In subtropical and tropical regions at low latitudes, it is extremely important how the amount of solar light is to be restricted and/or what temperature is to be controlled for appropriate culture of plants. At present, culturing of crops not suited to the geographical conditions must simply be given up. Also, in cold zones, an enormous amount of energy is needed for elevating a temperature suitable for culture. And, an enormous amount of electric energy is needed for ensuring sufficient light amount.

Patent Documents 17 through 19 identified below describe placing a light-shielding film sheet over a crop plant or an agricultural house for restricting the large amount of solar light (heat). These solar light (heat) absorption/ control building components are formed by incorporating in the agricultural film sheet a substance which restricts solar light, so that the materials constantly cut the solar beam by a predetermined ratio. Notwithstanding, these materials do not allow change of their ability to absorb/control the solar light (heat). Therefore, as these materials shield a fixed amount of solar light even at hours or on a day when the amount of solar radiation is small, such as at the morning or evening hours or on a cloudy day. Hence, they provide adverse effect to the culture of crop plants due to the amount of light falling far below the amount suitable for their culture.

Further, in a house or a building too, its roof or wall is heated due to daytime solar radiation, so that there occurs rise in the temperature in the living space inside, thus deteriorating the living environment. If air conditioning is effected for reducing the temperature rise, the amount of electric energy required therefor will be enormous, thus promoting the global warming, hence causing vicious cycle.

Patent Documents 20 through 22 identified below describe heat-insulating films for restricting entrance of solar radiation through windows for preventing the above problem. However, these conventional solar light (heat) absorption/control building components are also unable to allow change of their ability to absorb/control the solar light (heat). Hence, these materials can be disadvantageous in the autumn/winter seasons or on cloudy days when the amount of solar radiation is small. Moreover, although the convention has provided some improvements in the heat insulating material for building wall or roof or method of heat insulation, as these heat insulating methods are passive heat insulation methods, these suffer the problem that the temperature of the heat insulating material per se rises, in accordance of which its heat insulating effect deteriorates over time.

PRIOR ART DOCUMENTS

Patent Documents

Patent Document 1: Japanese Unexamined Patent Application Publication No. 2001-99497
Patent Document 2: Japanese Unexamined Patent Application Publication No. 7-139819
Patent Document 3: Japanese Unexamined Patent Application Publication No. 2006-336960
Patent Document 4: Japanese Unexamined Patent Application Publication No. 2006-214654
Patent Document 5: Japanese Unexamined Patent Application Publication No. 2008-138899
Patent Document 6: Japanese Unexamined Patent Application Publication No. 2004-176966
Patent Document 7: Japanese Unexamined Patent Application Publication (Translation of PCT Application) No. 2008-542681
Patent Document 8: Japanese Unexamined Patent Application Publication (Translation of PCT Application) No. 2002-517707
Patent Document 9: Japanese Unexamined Patent Application Publication No. 2000-88359
Patent Document 10: Japanese Unexamined Patent Application Publication No. 2008.133991
Patent Document 11: Japanese Unexamined Patent Application Publication No. 5-52427
Patent Document 12: Japanese Unexamined Patent Application Publication No. 6-137688
Patent Document 13: Japanese Unexamined Patent Application Publication No. 2004-176966
Patent Document 14: Japanese Unexamined Patent Application Publication No. 2005-265251
Patent Document 15: Japanese Unexamined Patent Application Publication No. 2004-116964
Patent Document 16: Japanese Unexamined Patent Application Publication (Translation of PCT Application) No. 11-512173
Patent Document 17: Japanese Unexamined Patent Application Publication No. 2004-65004
Patent Document 18: Japanese Unexamined Patent Application Publication No. 2009-45027
Patent Document 19: Japanese Unexamined Patent Application Publication No. 2006-340675
Patent Document 20: Japanese Unexamined Patent Application Publication No. 2001-287291
Patent Document 21: Japanese Unexamined Patent Application Publication No. 2006-144538
Patent Document 22: Japanese Unexamined Patent Application Publication No. 2009-169252

SUMMARY OF THE INVENTION

The present invention has been made in view of the above-described state of the art. The invention purports to develop a solar light (heat) absorption material having excellent solar light (heat) absorbing ability and to utilize this material to provide a low-cost, high-performance heat absorption/accumulation material having a simple structure and also to provide a solar water heater, a cooling system, an electricity generating system utilizing hot heat generated from this heat absorption/accumulation material.

The invention further purports to utilize the above-described solar light (heat) absorption material to provide a solar light (heat) absorption/control building component which allows easy change in its solar light (heat) absorption/control ability and to provide also an agricultural/horticultural facility or a house/building that allows saving of unnecessary cooling/heating energy, thus contributing to saving of fossil fuel and preservation of global environment.

The present inventors have conducted extensive research to resolve the above-noted object and discovered that a dispersion material comprising particles of biomass char etc. dispersed in a medium such as water has excellent solar light (heat) absorption/control ability and that using this as a heat absorption/accumulation material will reverse the conventional concept of solar water heater, providing a structure in which a heat absorption material is dispersed and integrated into a heat accumulation material, thereby to make it possible to satisfy all of the conventionally incompatible requirements of simplification of the structure, cost reduction and performance improvement.

It was also discovered that by changing the kind, size and/or dispersion content of the particles, the solar light (heat) absorption/control ability of the material can be easily changed. In this way, the present invention has been completed.

Namely, the present invention provides a solar light (heat) absorption material comprising particles, which have L*value of 30 or less as determined by the CIE-Lab color system (light source D65), dispersed into a liquid medium having a specific heat ranging from 0.4 to 1.4 cal/g/° C. and a melting point of 5° C. or lower.

Further, in the solar light (heat) absorption material, said particles comprise carbonized materials of biomass having micropores such as bagasse. The presence of such micropores can achieve improvement in the dispersion of the particles, the absorbance of the solar light (heat). Furthermore, the utilization of biomass achieves increased safety, restriction of the load to the environment.

Further, the present invention comprises a heat absorption/accumulation material formed of said solar light (heat) absorption material.

Further, there is provided a heat absorption/accumulation structure having said heat absorption/accumulation material filled in a container having an opening thereof covered with a light transmitting body.

Further, there is provided a solar water heater, a cooling system and an electricity generating system utilizing the above-described heat absorption/accumulation structure.

Further, the present invention provides a solar light (heat) absorption/control building component comprising a hollow portion and an amount of said solar light (heat) absorption material filled in the hollow portion of a plate-like body having an upper face and a lower face at least one of which has light transmission characteristics.

In the above-described solar light (heat) absorption/control building component, the solar light (heat) absorption material is circulated to/from an external instrument.

With the above, it becomes possible to disperse the particles uniformly into the solar light (heat) absorption material and to utilize an amount of the solar heat absorbed and accumulated in the solar light (heat) absorption material.

In the above-described solar light (heat) absorption/control building component, the component further comprises a detecting means for detecting a outside condition and an adjusting means for adjusting the light absorbance of the solar light (heat) absorption material according to the outside condition.

With the above, it is possible to adjust the solar light (heat) to be absorbed/controlled in accordance with the outside condition. Hence, the solar radiation amount can be controlled to be constant irrespective of influences from the time of the day, weather, the season, etc.

Further, in said solar light (heat) absorption/control building component, said outside condition comprises lightness and/or temperature.

Further, in said solar light (heat) absorption/control building component, the component further comprises a converting means for converting the solar heat absorbed by the solar light (heat) absorption material into hot water/air or cold water/air.

With the above, the solar heat absorbed and accumulated by the solar light (heat) absorption material can be effectively utilized.

The solar light (heat) absorption/control building component is one of a windowpane, a roof tile, a roofing material.

Further, there is provided an agricultural/horticultural facility using said solar light (heat) absorption/control building component in its wall and/or ceiling.

With the above, unneeded energy for cooling/warming can be eliminated in an agricultural/horticultural facility. Hence, it becomes also possible to make significant contribution to the saving of fossil fuels and preservation of the global environment.

Further, there is provided a house/building using said solar light (heat) absorption/control building component in at least a part of its wall, window, roof or roof top.

As the solar light (heat) absorption/control building component functions as an excellent heat insulating material, it is possible to reduce the amount of energy required for temperature condition of the indoor space significantly. As a result, unneeded energy for cooling/warming can be eliminated in a house/building. Hence, it becomes also possible to make significant contribution to the saving of fossil fuels and preservation of the global environment.

The solar light (heat) absorption material of the invention has an excellent solar light (heat) absorbing ability. Further, as this material uses char particles originated from harmless biomass, waste material can be effectively utilized and also the load to the environment can be alleviated. Further, in case this is used as a heat absorption/accumulation material, as the particles of the heat absorption material are dispersed into the liquid of the heat accumulation material and in association with rise in the temperature of the heat absorption material, the heat is transferred directly to the heat accumulation material around it, heat loss in the course of heat conduction process can be restricted. In the case of the convention, in association with temperature rise due to heat absorption, dissipation of heat by black body radiation from the heat absorption material per se occurs inevitably. On the other hand, in the case of the present invention, since the heat absorption material is dispersed into the heat accumulation material, all of the heat dissipation from the heat absorption material is absorbed by the heat accumulation material. In this way, the heat loss in the heat conduction process is reduced and no dissipation of heat to the outside occurs, so the efficiency of the solar heat absorption is high.

Further, in order to obtain high-temperature heat, the conventional techniques combine a light collecting plate having a large area and a heat accumulation tank having a small area. However, as the area of the heat collecting plate is increased, the amount of dissipation heat increases correspondingly. Hence, there would be required a measure to cope with this, so the technique would suffer from this vicious cycle and the conventional technique was not found satisfactory in terms of efficiency and cost. In contrast, in the case of the present invention, the temperature of the accumulated heat can be controlled by adjustment of the thickness of the heat absorption/accumulation material layer. Therefore, high-temperature heat can be obtained extremely easily and at low cost.

Further, with the solar light (heat) absorption/control building component of the present invention, its solar light (heat) absorption/control ability can be easily changed by changing the kind, size and/or dispersion content of the particles. Further, by using this component in an agricultural/horticultural facility or a house/building, excess energy for cooling/warming can be eliminated and it becomes also possible to make significant contribution to the saving of fossil fuels and preservation of the global environment.

DETAILED DESCRIPTION OF THE INVENTION

Figure 1:
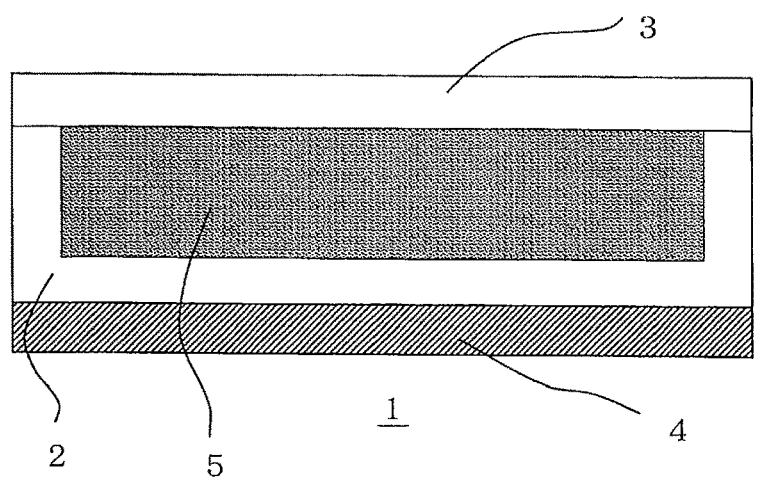
FIG. 1 is an illustrating section view showing one embodiment of a heat absorption/accumulation structure relating to the present invention.

The solar light (heat) absorption material according to the present invention comprises particles, which have L*value of 30 or less as determined by the CIE-Lab color system (light source D65), dispersed into a liquid medium having a specific heat ranging from 0.4 to 1.4 cal/g/° C. and a melting point of 5° C. or lower.

The medium (dispersion) employed in the present invention is a medium which is liquid at the normal temperature and has a specific heat ranging from 0.4 to 1.4 cal/g/° C. and a melting point of 5° C. or lower. With choice of the specific heat and melting point in the above-described respective ranges, the amount of the medium used can be made appropriate and there is obtained cost advantage as well. Further, by choosing the melting point of 5° C. or lower, the medium becomes usable in many various places and hours of the day. Specifically, as examples thereof, there can be cited water, aliphatic mono alcohol, aliphatic di-alcohol, hydrocarbon, etc. Water can be suitably used directly. However, in order to lower the melting point and/or restrict proliferation of bacteria or the like, water can be used with an inorganic material or an organic material dispersed or dissolved therein. The inorganic material includes a metal chloride such as calcium chloride, sodium chloride, magnesium chloride, potassium chloride, strontium chloride, lithium chloride, ammonium chloride, barium chloride, iron chloride, aluminum chloride, or a bromide of a similar group. The organic material includes ethanol, ethylene glycol, propylene glycol, glycerin, sucrose, glucose, acetic acid, oxalic acid, succinic acid, lactic acid, dispersed or dissolved therein. As some examples of aliphatic mono alcohol, there can be cited ethyl alcohol, propyl alcohol, butyl alcohol, amyl alcohol, hexane alcohol, etc. As some examples of aliphatic di-alcohol, there can be cited ethylene glycol, propylene glycol, polyethylene glycol, polypropylene glycol, etc. As some examples of hydrocarbon, there can be cited aromatic hydrocarbons, or chlorinated aromatic hydrocarbons, such as paraffin, benzene, xylene, chlorobenzene, etc. In the respects of safety, readiness of handling, absence of corrosiveness, and low cost, water is most preferred of the above-cited media. When high-temperature heat is needed, ethylene glycol, glycerin, having a high boiling point or mixture solution of these with water will be used.

On the other hand, the color of the particles should be black for increased absorption of solar light (heat). When represented in the CIE-Lab color system which is the international standard of representing color tones of objects, the particles have an L*value (L-value) of 30 or less which is the reference of whiteness and blackness of an object, preferably 28 or less, more preferably from 3 to 25. In the L*value, the value of 0 represents a black body, i.e. the reference of absorbing all light, thus being most preferred. However, in order to render this value 0 requires significant cost and yield will be poor also. As can be understood from its L*value, although the particles per se are capable of absorbing solar light, this is not suitable for adjustment of degree of absorption or utilization of absorbed heat. Then, in the present invention, in order to enable adjustment of degree of absorption and utilization of absorbed heat, the particles are used as being dispersed in the medium. Specifically, biomass char, commercially available carbon black, carbon nanotube, iron black, copper-iron black, other organic pigments, inorganic pigments, etc. can be cited as examples. However, in the case of using iron black, copper-iron black, other organic pigments, inorganic pigments, etc., it is important that sufficient care be taken for the safety, dispersion performance relative to the medium. On the other hand, biomass char is suitably used, since it is superior not only in the safety, but also in the dispersion performance relative to the medium, and provides less load to the environment. As some examples of biomass char, there can be cited bagasse waste of squeezed sugarcane, coffee residue, soybean milk residue, chaff, rice bran, sake lees after fermentation of sake or liquor ("Moroni"), various kinds of natural fibers, chars of woods. Different from artificial substance, these biomasses have fine pore structure due to biological phenomenon. And, such pore structure remains after carbonization and reduces the bulk specific gravity and improves dispersion into the medium and solar light (heat) absorption/accumulation performance. The size of the pores (micropores) can be adjusted through the choice of the kind of biomass or carbonization condition. However, in the case of applications of the present invention, the major diameter of the aperture of the pore should range 100 μm or less, preferably from 5 to 50 μm. The ratio (ratio of area) of pores (micropores) is at least 10%, preferably from 20 to 70%. And, such biomass char can be manufactured by any conventional method. For instance, particles of bagasse char, which is the squeezed waste of sugarcane, can be manufactured by the following method.

Sugarcanes harvested from a sugarcane field have their roots, leaves, and heads chopped off and then shipped to a sugar milling factory. Thereafter, while hot water or steam is being sprayed over them, the sugarcanes are crushed through several passes of metal rollers to squeeze an amount of sugar juice therefrom. With this, there is produced an amount strained lees (bagasse) substantially free of sugar. As this bagasse contains some water, the bagasse is dried at a temperature of 100° C. or higher prior to carbonization thereof. Preferably, this drying process is performed in a non-oxidizing atmosphere of e.g. nitrogen atmosphere, in order to restrict quality change. After drying, heating carbonization is performed also in a nitrogen atmosphere in e.g.

a standard electric furnace. As the heat source for carbonization, a heat source of external heating, a self-combustive heat source configured to cause combustion of a part of the bagasse, etc. are employed. In case the carbonization is performed in an experimental laboratory, with flowing of nitrogen gas in a muffle type electric furnace, heating is effected from the normal temperature to a predetermined temperature, normally 200° C. or higher, preferably from 300 to 1000° C., more preferably from 400 to 900° C., at the rate of temperature raising of 5 to 50° C. If the temperature increase rate is faster than 50° C., this tends to invite non-uniform temperature distribution. Conversely, if the temperature raising rate is slower than 5° C., this is disadvantageous economically. Once the predetermined temperature has been reached, the heating is continued at that reached temperature for at least e.g. 1 hour, preferably 2 to 5 hours. If the heating time is shorter than 1 hour, this will tend to invite formation of partial mottles due to uneven heating. Whereas, if the heating time is too long, it is not only economically disadvantageous, but also can invite quality deterioration. Preferably, after heating, the flow of nitrogen is continued and cooling to the room temperature is effected by natural cooling. In this way, black carbon made from raw material of bagasse (bagasse char) is obtained. This bagasse char is then pulverized by e.g. a blender, and also classified if necessary, whereby particles of bagasse char are obtained.

Preferably, the above-described particles have a bulk specific gravity of 0.3 g/ml or less, preferably from 0.05 to 0.2 g/ml approximately. Incidentally, the bulk specific gravity is a value determined by JISK7365-1999 (method of obtaining an apparent density of a material that can be poured from a specified funnel: ISO60:1977).

Further, the above-described particles preferably have a particle diameter of 3 mm or less, more preferably, from 0.01 to 1 mm. If the particle diameter is confined within this range, the dispersion into the medium is favorable. And, particles having such particle diameter can be obtained by classifying with a sieve. That is, particles of 3 mm or less can be obtained by collecting those passing through 6-mesh sieve. Also, particles of 0.01 to 1 mm can be obtained by collecting those passing through the 16-mesh and then collected on the 170-mesh sieve. The precise particle size of each individual particle can be observed with a microscope. However, errors can occur due to the variation of the shapes thereof. Therefore, for practical use, particles of appropriate size collected with using the above-described sieves should be used, preferably.

In the case of the solar light (heat) absorption material of the present invention, particles should be dispersed into a medium by normally 0.01 to 5 mass %, preferably from 0.1 to 1 mass %, more preferably from 0.3 to 0.7 mass % (referred to simply as "%" hereinafter). The characterizing feature of the present invention resides in that any biomass char particles, even in dispersion of an extremely low content, can achieve sufficient solar heat absorption/accumulation effect and solar light (heat) absorption/control effect. Dispersing of particles into the medium can be performed by any standard method. For instance, a rotary blade type stirring machine having various kinds of stirring blades, a vibration type stirring machine having vibration plates, a rotary type stirring machine which effects stirring by rotation, a liquid-flow type stirring machine configured to effect stirring by generating or colliding liquid flow, a ball mill, an extruder having a rotary screw, etc. can be employed. In general, in case the dispersion content of the particles is high and the viscosity of the medium is high, a rotary blade type stirring machine, or an extruder will be employed. Whereas, in case the dispersion content of the particles is low and the viscosity of the medium is low, any stirring machine other than an extruder can be used. Further, the degree of dispersion can be readily recognized from the outer appearance of the dispersion.

The solar light (heat) absorption material of the present invention can additionally contain a substance having a phase transition temperature in the temperature range from 50 to 120° C., with this substance being out of direct contact with the medium. For instance, in case the solar light (heat) absorption material is used as a heat absorption/accumulation material in a solar water heater or the like, it can sometimes happen that the time of collecting heat by solar radiation is not necessarily in agreement with the time requiring hot water supplying or air cooling or warming. In such case, if there is provided a substance having a phase transition temperature in the temperature range from 50 to 120° C., preferably from 70 to 120° C., with this substance being out of direct contact with the medium, it becomes possible to utilize the amount of heat accumulated in this substance at night time. As such substance, a so-called heat accumulation material can be employed. For instance, as some examples thereof, there can be cited paraffin, polyethylene wax, polyethylene, alpha olefin copolymer, ethylene methacrylate copolymer, ethylene vinyl alcohol copolymer, modified polyester, polycaprolactone, polybutyl succinate, or an alloy of two or more kinds of these polymers, or a low molecular weight compound having a melting in the above-specified temperature range. However, in the respect of moldability, readiness of handling, and safety, it is preferred to use a substance having a molecular weight in the polymer or oligomer region, e.g. polyethylene, alpha olefin, ethylene vinyl alcohol copolymer, modified polyester, etc. In order to allow such substance to be present not to be in direct contact with the medium, a method of causing the substance to be contained within a substance having a higher melting point can be employed. For instance, a variety of methods, such as an encapsulating method, a method of filling the substance in a tube, a method of filling the substance in a container, etc. can be employed. Further, the kind and amount of the heat accumulation material can be determined appropriately, depending on the use, performance, etc. For instance, if a large amount of heat is to be used at night time, the amount will be increased. In case a high-temperature heat is needed, there will be employed a heat accumulation material having a high temperature melting point.

The heat absorption/accumulation material of the present invention comprises the above-described solar light (heat) absorption material comprising particles, which have L*value of 30 or less as determined by the CIE-Lab color system (light source D65), dispersed into a liquid medium having a specific heat ranging from 0.4 to 1.4 cal/g/t and a melting point of 5° C. or lower. In this way, as the particles of heat absorption material are dispersed into the liquid medium of heat accumulation material, in association with rise of temperature of the heat absorption material, the heat will be conducted directly to the heat accumulation material present about the heat absorption material. Therefore, the heat loss in the heat conduction process is small. Further, in the case of the convention, in association with temperature rise of heat absorption material due to its progressive heat absorption, dissipation of heat due to black body radiation from the heat absorption material per se would inevitably occur. With the present invention, however, since the heat absorption material is dispersed into the heat accumulation material, the emitted heat from the heat absorption material too can be absorbed by the heat accumulation material, so that there occurs less wasteful heat dissipation to the outside, hence, the absorbing efficiency is high.

A heat absorption/accumulation structure according to the present invention is configured such that the above-described heat absorption/accumulation material is filled within a container having an opening portion thereof covered with a light transmitting body. FIG. 1 is a diametrical section view showing one embodiment of the inventive heat absorption/accumulation structure. Numeral 1 denotes the heat absorption/accumulation structure as a whole. Numeral 2 denotes the container. Numeral 3 denotes the light transmitting body. Numeral 4 denotes a heat insulating material. Numeral 5 denotes the heat absorption/accumulation material. The material forming the container 2 is metal, glass, resin, etc. and preferably this container is coated with a heat insulating material of organic foam material such as styrene foam, urethane foam or glass fiber, inorganic fiber, etc. Further, as the light transmitting body 3, glass or the like is employed. And, this member 3 is attached to the container 2 in airtight and inside thereof is filled with the heat absorption/accumulation material 5. Needless to say, there may be affixed a selective light transmission film for reflecting heat radiation emitted from the heat accumulated medium. The thickness of the heat absorbing/accumulating layer (liquid depth) should be controlled so as to render a transmittance for light of 550 nm to be 10% or less, preferably 5% or less, more preferably 1% or less. For instance, in case bagasse char particles are dispersed in water, even in a dispersion content of as low as about 0.3 mass %, the thickness of 10 mm will be sufficient for absorbing substantially 99% or more of solar light (heat). If the light transmittance exceeds 10%, this will cause substantially no problem in the absorption of solar light (heat), but, there can sometimes occur such problem as heating of the mounting table or roof installed. With the heat absorption/accumulation structure according to the present invention, the accumulated heat temperature rises with decrease in the thickness of the heat absorption/accumulation material layer. Therefore, it is possible to adjust the accumulated heat temperature easily and at low cost.

Heat accumulated in the above-described heat absorption/accumulation structure can be utilized for various kinds of solar heat utilizing apparatuses. For instance, in case water is used as the above-described medium, with removal of the particles from the heated heat absorption/accumulation material with using a conventional separating means such as filtration, the structure can be used directly as a solar water heater for shower or bathing.

Figure 2:
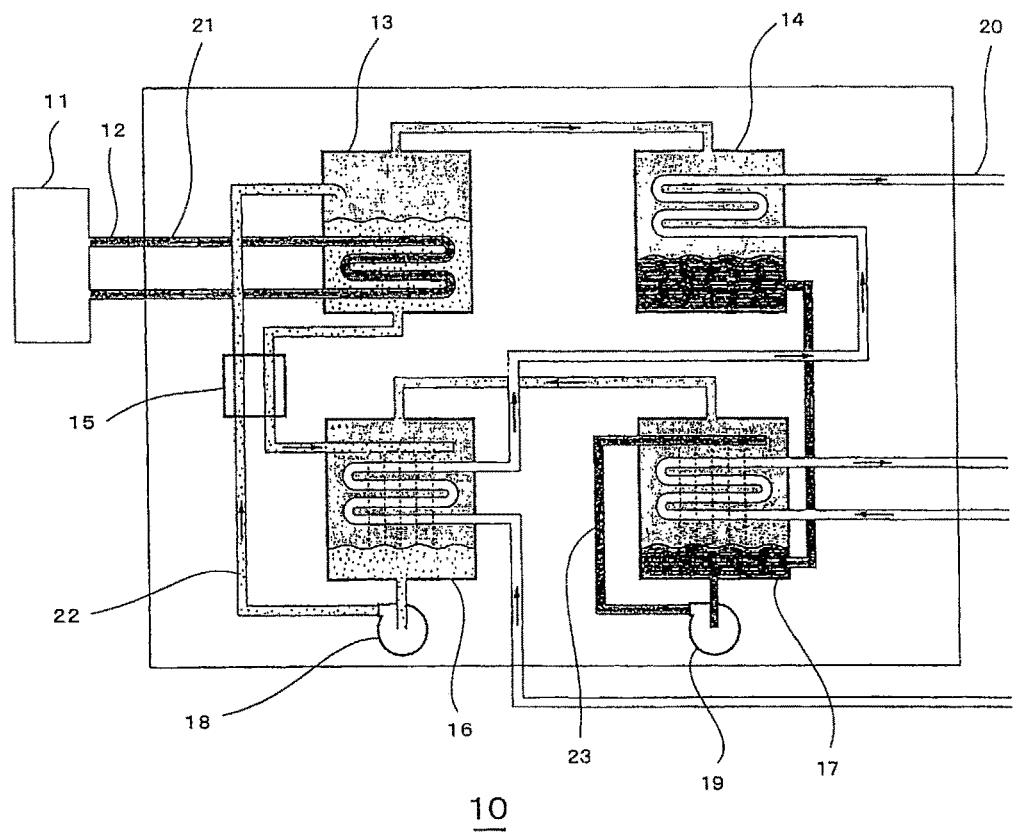
FIG. 2 is a view showing a cooling system according to the present invention, FIG. 3 are schematic views showing one embodiment of a solar light (heat) absorption/control building component according to the present invention, (a) being a perspective view, (b) being a plan view, (c) being a front view, (d) being a side view.

Further, by using the accumulated heat as a heat source of an absorption refrigerator or an adsorption refrigerator, the structure can be used as a cooling system. FIG. 2 is a view showing one mode of an absorption refrigerator utilizing hot medium such as hot water which has accumulated heat by the inventive solar heat absorption/accumulation material as a higher-temperature side heat source. Numeral 11 denotes the inventive absorption/accumulation structure. Numeral 12 denotes a heat medium pipe. Numeral 13 denotes a regenerator. Numeral 14 denotes a condenser. Numeral 15 denotes a heat exchanger. Numeral 16 denotes an absorber. Numeral 17 denotes an evaporator. Numeral 18 denotes an absorbent pump. Numeral 19 denotes a coolant pump. Numeral 20 denotes a cooling water pipe. Numeral 21 denotes a medium. Numeral 22 denotes an absorbent. Numeral 23 denotes a cooling medium. The heat source temperature required on the higher temperature side will vary, depending also on the type of absorption refrigerator, but should be at least 65° C., preferably about 70° C. The upper limit thereof is not particularly limited. For instance, in the case of the multi-stage effect type as shown in FIG. 2, if the heat source temperature is higher, the refrigerator can be made more efficient, such as double-effect or triple-effect type.

Further, by utilizing the accumulated heat as a heat source for temperature-difference power generation, this can be constructed as a power generation system utilizing solar heat. The temperature-difference power generation is a method in which like a marine temperature-difference power generation, a medium having a low boiling point is evaporated/expanded with a higher-temperature heat source and the resultant mechanical energy is used for rotating a turbine for power generation.

Figure 3:
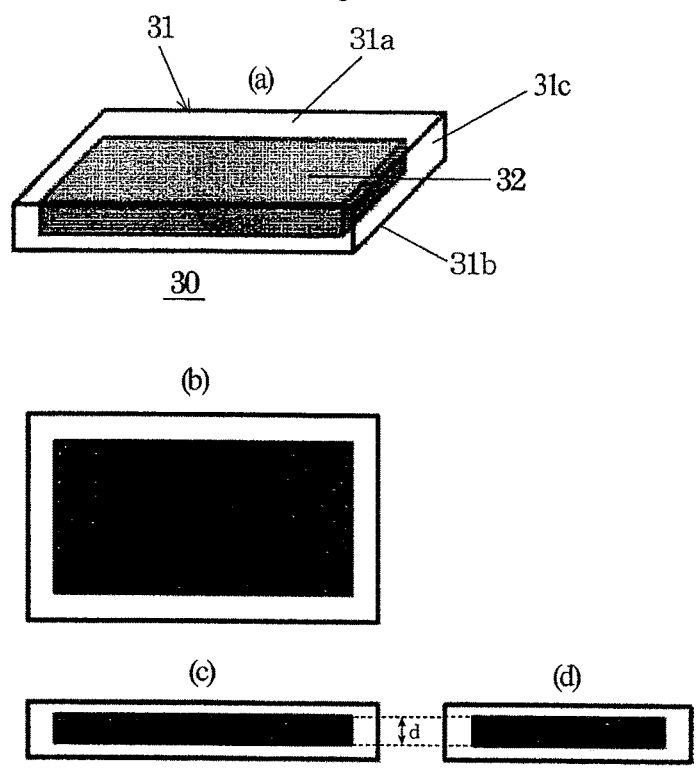

A solar light (heat) absorption/control building component according to the present invention comprises an amount of the above-describe solar light (heat) absorption material filled within a hollow portion of a plate-like body having the hollow portion. FIG. 3 shows a schematic view of one embodiment of the solar light (heat) absorption/control building component 30 according to the present invention. FIG. 3 (a) is a perspective diagram of the solar light (heat) absorption/control building component 30 according to the present invention. FIG. 3 (b) is a plan view of the same. FIG. 3 (c) is a front view of the same. FIG. 3 (d) is a side view of the same. The solar light (heat) absorption/control building component 30 is configured such that an amount of solar light (heat) absorption material 32 is filled within a hollow portion of a plate-like body 31 and at least one of its upper face 31a and lower face 31b has light transmissive characteristics.

The thickness (d) (i.e. the distance between the upper face and the lower face) of the hollow portion filled with the solar light (heat) absorption material 32 can be set as desired in accordance with the purpose or a required performance. For the purpose of absorption of solar light, the thickness is normally not more than 20 mm, preferably from 3 to 10 mm. The greater the thickness, the greater the weight, thus making e.g. installment more difficult. Conversely, if the thickness is too small, the dispersion condition of the particles can sometimes be uneven.

The plate-like body 31 is formed of a glass plate or a thermoplastic resin plate, such as polystyrene, polymethylmethacrylate, polycarbonate, polypropylene, polyethylene, polyethylene terephthalate, polyvinyl chloride, polyacetal, polyphenylene oxide, polyvinyl butyral, poly-4-methyl pentene-1, etc., or a thermosetting resin such as melamine resin, epoxy resin, phenol resin, urethane resin, diallyl phthalate resin, unsaturated polyester resin, etc. As for the thickness of the glass plate or resin plate constituting the plate-like body 31, the smaller size, the lighter weight and the lower cost can be achieved with thinner thickness. However, in consideration of such factors as the strength, the durability, etc., the thickness is normally between 1 mm or more and 20 mm or less, preferably, between 2 mm or more and 10 mm or less. In particular, in case e.g. the area is 1 $m^2$ or less, the thickness of 2 mm or more and 5 mm or less will be sufficient. Incidentally, in order to maintain sufficient thickness of the hollow portion of the plate-like body 31, using a reinforcing member (rib) at a portion thereof will be preferred also. This rib is advantageous also because it controls the flow pathway of the dispersion liquid discharged therein. It is necessary that at least one of the upper face 31a and the lower face 31b of the plate-like body 31 have light transmissive characteristics. However, if a plate-like body 31 having light transmissive characteristics in both faces is provided, it becomes possible to obtain transmission light. The plate-like body 31 can be obtained by bonding glass plates or resin plates together or integral molding of a resin material by any conventional method. When the solar light (heat) absorption material 32 is to be filled in the plate-like body 31, the body will be molded with leaving one face of a glass plate constituting this plate-like body 31 open or exposed to the outside. Then, an amount of the solar light (heat) absorption material 32 will be charged through the opening and then sealed by bonding the remaining glass plate or the like. Alternatively, an opening may be formed in an integrally molded plate-like body 31 and then an amount of the solar light (heat) absorption material 32 may be filled therethrough and then the opening will be closed.

With the inventive solar light (heat) absorption/control building component 30 having the above-described structure, with the dispersion of particles into the medium, efficient absorption of solar light (heat) is possible. Further, as the emitted heat from the heat-absorbed particles due to black body radiation is absorbed by the medium, emission of heat to the outside can be minimized, so that the absorption efficiency of solar light (heat) can be extremely high. For instance, it has been found that in the case of ethylene glycol liquid containing 0.5 mass % of bagasse char particles dispersed therein, if the thickness of the space filled with the solar light (heat) absorption material has a thickness of 5 mm, light of a metal halide lamp often employed as a pseudo solar light can be absorbed as much as 99% or more. This can be determined by the method illustrated in FIG. 4.

With the solar light (heat) absorption/control building component according to the present invention, the dispersion content of the particles into the solar light (heat) absorption material 32 can be chosen as long as the chosen content allows controlling of absorption or transmittance of the solar light (heat). Further, the content cannot be specified at a fixed value since it will be varied depending on the thickness of the space between the opposed plate-like bodies 31 also. Normally, however, at least 0.5 mass % is needed in the case of absorbing 99% or more of the solar light (heat).

The solar light (heat) absorption/control building component according to the present invention allows also adjustment of the light absorbing degree of the solar light (heat) absorption material based on the outside condition present in contact therewith. What is referred to here as "outside condition" can be air temperature, solar radiation amount, but is not limited thereto. The air temperature and solar radiation can be detected by a thermometer, a solar radiation meter, having a recording stylus capable of automatic input to a personal computer. For the adjustment of the absorbance of the solar light (heat) absorption material, this can be done by varying the dispersion content of the particles and the thickness. However, changing the dispersion content is more practical. Specifically, there will be prepared solar light (heat) absorption materials for adjustment with particles contents thereof changed in a plurality of steps and tanks of water for dilution. Then, by changing the flow rate of the liquid feeding pump attached to each tank, the particle dispersion content can be changed-as desired. That is, when the lightness of the outside is high (bright), the liquid feeding amount of the solar light (heat) absorption material having a high dispersion content is increased so as to reduce the amount of transmittance light through the solar light (heat) absorption/control building component. On the other hand, when there is a shortage of outside lightness, the amount of water added is increased so as to reduce the particle dispersion content, thereby to increase the amount of transmittance light through the solar light absorption/control building component. Incidentally, determination of the dispersion content of particles can be effected by forming a transparent portion having a predetermined path width (e.g. 10 mm) and passing light having a predetermined wavelength (e.g. 550 nm) and determining its absorbance. In this way, through adjustment of the absorbance of the solar light (heat) absorption material according to the outside condition, it is possible to maintain constant the amount of solar radiation transmitting through the solar light (heat) absorption/control building component.

The solar light (heat) absorption/control building component according to the present invention can be provided in the form of a windowpane, a roof tile or roofing material. Specifically, the solar light (heat) absorption material can be held and contained within a double-layered light-transmitting windowpane, so that the resultant assembly can be used as a window. This permits adjustment of transparency, adjustment of solar radiation amount and adjustment of the indoor temperature. This has many features such as being less expensive and requiring less driving power than the known photochromic material. Further, in the case of providing in the form of a roof tile or roofing material, it is also possible to cause the inventive solar light (heat) absorption material to be contained within an intermediate layer of a light-transmitting roof tile or flat roofing material. With this, it becomes possible to adjust the solar radiation amount from the roof and the temperature. Conventionally, in order to permit introduction of solar light from the roof, there was employed a stationary type glass plate. This suffered from the problem of introduction of solar light into the room even on hot summer day, thus causing the room temperature rise. On the other hand, with the present invention, adjustment of light absorbance is possible through adjustment of the content of the particles in the solar light (heat) absorption material, so that it is readily possible to shield solar radiation in the summer and to allow introduction of additional solar radiation in the winter.

Further, the inventive solar light (heat) absorption/control building component can be installed as a wall, roof or the like of an agricultural/horticultural facility or can be provided in the form of a roofing material or wall material of an agricultural/horticultural facility. The solar light (heat) absorption material can control the amount of solar light (heat) permitted into the agricultural/horticultural facility in order to obtain the effect of absorbing or controlling/adjusting the solar light (heat), thereby to allow restriction of temperature rise inside the facility or the adjustment of the light amount. In "Okinawa", the amount of solar light during daytime of summer season can be as much as 2500 μmol/$m^2$/sec (micro mol/square meter/second). Whereas the amount of solar light needed for summer vegetables is from 200 to 300 μmol/$m^2$/sec, so that the culturing of summer vegetables is almost impossible due to too strong sunbeam. However, if the inventive solar light (heat) absorption/control building component is used as a ceiling material or wall material of an agricultural/horticultural facility or installed in an exterior wall, roof, etc., thereby to enable adjustment of the solar light, such culture will be made sufficiently possible. Further, by adjusting the light absorbance through adjustment of the amount of particles dispersed into the solar light (heat) absorption material, the adjustment of transmittance of the solar light is made possible as described hereinbefore. Then, using this function, there is achieved a significant advantage as follows. Namely, when the solar light is small at the morning or evening time, the dispersion content will be reduced so as to increase the transmission amount of the solar light whereas when the solar light is large at the daytime, the dispersion content will be increased so as to reduce the solar light transmission. In these ways, the amount of solar light reaching the indoor can be properly adjusted (see FIG. 12). This is a major characterizing feature of the inventive building component.

The solar light (heat) absorption/control building component according to the present invention can be installed in a window, wall, roof or rooftop of a standard house or building. With this, heating of the house or building due to the solar light (heat) can be significantly reduced. For instance, by installing this material in a window, it becomes possible to adjust the amount of sunbeam transmittance. Further, if it is installed in a wall, roof or rooftop, the material will work as an extremely high performance heat insulating material.

That is, as described above, as the particles are dispersed into a dispersion liquid, control of light absorbance is made possible as desired through adjustment of its content, the material can achieve the significant function of controlling the transmittance of the solar light (heat). And, if this adjusting function is linked with the solar light during daytime, it becomes possible to adjust the solar light and the solar light introduction time as described. This is a novel method of adjusting the solar light, solar light introduction time or indoor environment adjustment for an agricultural/horticultural facility or a standard house or building.

The solar light (heat) absorption material in the inventive solar light (heat) absorption/control building component can be confined within the hollow portion of the plate-like body. Alternatively, this material can be circulated to/from an external instrument such as a tank. For this circulation, a pump is used normally. Instead, a natural circulation arrangement will also be possible which utilizes change in the specific gravity of a medium whose temperature has risen due to absorption of solar light (heat). And, by means of circulation, the solar heat absorbed and accumulated in the solar light (heat) absorption material can be utilized separately.

Further, the solar heat absorbed in the solar light (heat) absorption material contained in the inventive solar light (heat) absorption/control building component can be converted into hot water or hot air, which is then used directly as hot water or heating air in a private residential house, office building or factory. Alternatively, the heat can be converted into cold water or cooling air also. For instance, if the material is used as a high-temperature heat source of an absorption refrigerator or an adsorption refrigerator, cooling indoors is made possible. More specifically, hot water converted from the solar heat can be used as it is as a high-temperature heat source of an absorption refrigerator or can be used as a main heat source of the discharge heat input type gas adsorption water heater, whereby cool air can be produced. In this way, through combination of the solar light (heat) absorption/control building component utilizing char particles from biomass and the discharge heat input type gas adsorption water cooling/heating machine, it becomes possible to realize a cooling/heating system having high energy saving performance through effective utilization of renewable energy.

EXAMPLES

Next, the present invention will be described in greater details with reference to some examples. It should be understood however that the present invention is not limited thereto. Incidentally, the notation of % unit will be used to represent the unit of mass % unless expressly indicated otherwise.

Example 1

Preparation of Bagasse Char (1)

In this example, there was employed a squeezed waste-(bagasse) of sugarcanes produced in Miyako Island in Okinawa in the year 2008. Firstly, the bagasse was dried under nitrogen gas flow at 100° C. for 12 hours. The bagasse thus obtained was in the form of milky white fine particles of 10 mm or less. Then, this bagasse was charged into an electric furnace and then heated progressively under nitrogen gas flow from the room temperature to 500 or 700° C. at the rate of 5° C./min. Once the predetermined temperature reached, a carbonization was carried out with keeping the temperature at the reached predetermined temperature for 5 hours. Thereafter, with continued flow of nitrogen, cooling was carried out to the room temperature by natural cooling. After this, it was found that all the bagasse had turned into black char (bagasse char). Then, this bagasse char was pulverized, for 10 minutes, at the rotation speed of 14000 by a laboratory blender made by stainless steel. After this pulverization, particles passing through a stainless sieve (mesh opening: 150 μm) were collected. It was found that all of these particles were uniform and had good fluidity as well. The each value (L values and bulk specific gravity) were obtained as follows. 500° C. (27:2, 0.077), 700° C. (29.0, 0.0863). Incidentally, the bulk specific gravity values were evaluated according to JISK7365-1999, a method of obtaining an apparent density of a material that can be poured from a specified funnel: ISO60:1977).

Example 2

Pseudo Solar Light Absorption Experiment (1)

Figure 4:
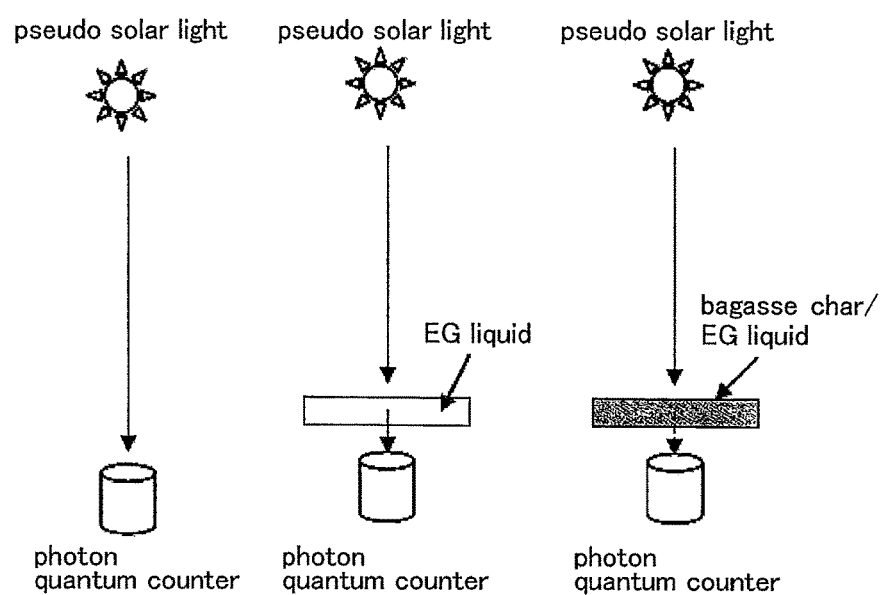
FIG. 4 is a diagrammatic view illustrating a model method of a pseudo solar radiation absorption experiment in EXAMPLE 2.

Into a petri dish of 10 cm in diameter, ethylene glycol (EG) liquid containing the bagasse char (500° C.) obtained in EXAMPLE 1 at the contents of 0% and 0.5% were charged to a depth of 1 cm and then subjected to irradiation by a commercially available halogen lamp (available from Toshiba Corporation) as a pseudo solar light whose output was adjusted to provide a light amount of 2800 μmol/m$^2$/sec (corresponding to the solar radiation amount in summer time in the city of Naha) and the amount of light past through the petri dish was determined. The light amount was determined by a commercially available photon quantum meter. From an EG liquid (Comparison Example) with no bagasse char content, photon quantum of 2660 μmol/m$^2$/sec was determined, thus it was found that irradiated light was hardly absorbed thereby. On the other hand, the photon past the EG liquid with 0.5% dispersion of bagasse char was 0.9 μmol/m$^2$/sec, indicating that 99.97% of light was absorbed thereby. The result of this experiment is shown in FIG. 4.

From the above-described experiment, it was found that with dispersion of as little as 0.5% of bagasse char, medium of 1 cm thickness is capable of completely absorbing solar light (heat). With increase of dispersion content, complete absorption is possible with even smaller thickness than the above. Further, at this time since the bagasse char absorbing solar light (heat) is dispersed into the medium, the absorbed heat will be conducted immediately to the medium present around it. This can be called direct heating, in comparison with the method of the conventional solar heat collector which heats medium indirectly. Hence, the efficiency can be very high. Even with a very small thickness, the heat collecting efficiency can be rendered 100% and such reduced thickness can contribute to lighter weight and readiness of installment over a large area.

Example 3

Absorption Characteristic Experiment (1)

In order to observe in details the light absorption characteristics of the bagasse dispersion liquid, there were observed LTV-visible absorption spectra of EG (Ethylene Glycol) media whose dispersion content of the bagasse char obtained in EXAMPLE 1, carbonized at 500° C. and past the 100 mesh were varied to 0% (comparison example), 0.1%, 0.5%, respectively. As the metering cell, there was employed a quartz cell 10 mm in width and 10 mm in thickness. And, the reference in the measurement was EG liquid with no bagasse char content. The measurement was done on the transmittance spectrum of light from the 200 nm to the near infrared region of 1100 nm. The results are shown in FIG. 5.

Figure 5:
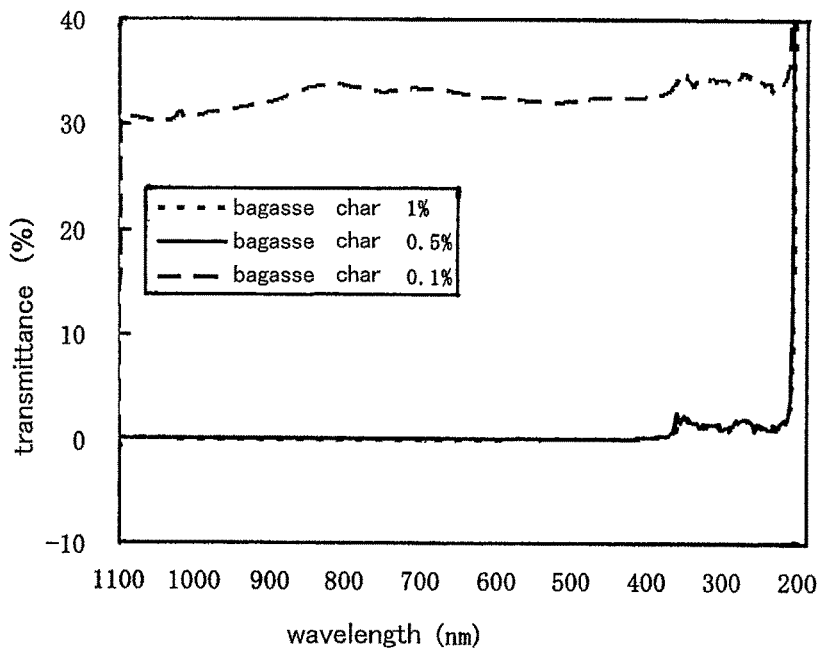
FIG. 5 is results of an absorption characteristics experiment in EXAMPLE 3.

FIG. 5 shows that with the 0.1% dispersion content, transmittance was from 30 to 35% in entire wavelength region. Whereas, with the content of 0.3% or higher, the medium shows only transmittance of less than 1% only, thus demonstrating absorption of almost all light. Incidentally, the discontinuity at 350 nm in the graph is due to a mechanical reason, namely, change of the light source. This result has substantially same meaning as the result of EXAMPLE 2. Further, the showing of intermediate degree of transmittance with 0.1% demonstrates that the present invention, when used in a window, has the function of adjusting the light or solar radiation amount.

Example 4

Temperature Rise Experiment

Figure 6:
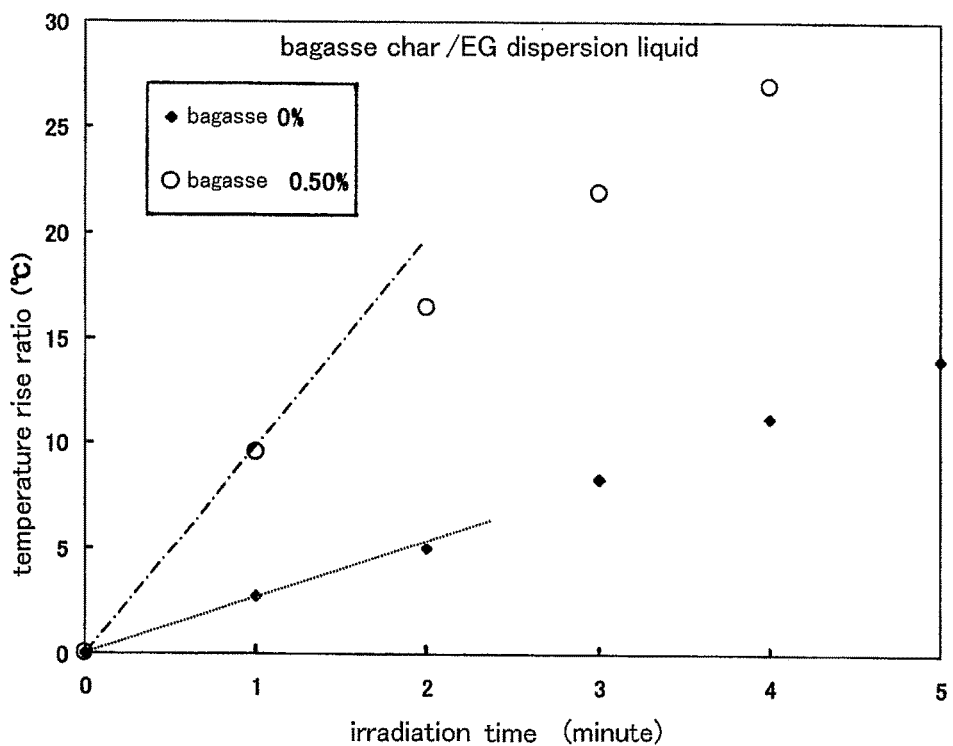
FIG. 6 is result of a temperature rise experiment in EXAMPLE 4, FIG. 7 are SEM photographs of bagasse char at each carbonization temperature in EXAMPLE 5, (a) 300° C., (b) 400° C., (c) 500° C., (d) 600° C., (e) 700° C., (f) 800° C.

The bagasse char (500° C.) obtained in EXAMPLE 1 was dispersed into EG liquid at the content of 0.5% and EG liquid with no addition of bagasse char was employed as the control. Like EXAMPLE 2, this dispersion was subject to irradiation by a pseudo solar light having intensity of 1997 μmol/m$^2$/sec (corresponding to solar radiation amount in the city of Naha near summer) and rise of temperature of the liquid inside over time was recorded. The result is shown in FIG. 6.

From this result, it is understood that the 0.5% bagasse char dispersed EG liquid provides higher rise in inside liquid temperature than the control. The intercept in the curve is also shown in the figure. The slopes thereof are 9.5° C./min in the case of the bagasse char 0.5% dispersed EG liquid and 2.7° C./min in the case of the control. That is, it is shown that with the present invention, temperature rise of 50° C. in 5 minutes can be expected. This is an extremely high temperature rise not reported in the convention. In the above, as the dispersion medium for bagasse char, EG liquid was employed. It was found that with use of EG, temperature of 100° C. or higher can be readily obtained which is a temperature not easily obtained with water. Incidentally, the reason why the temperature rise occurred in EG liquid per se without any bagasse char content is that EG absorbs infrared light of 1200 nm or higher.

Example 5

Preparation of Bagasse Char (2)

Figure 7:
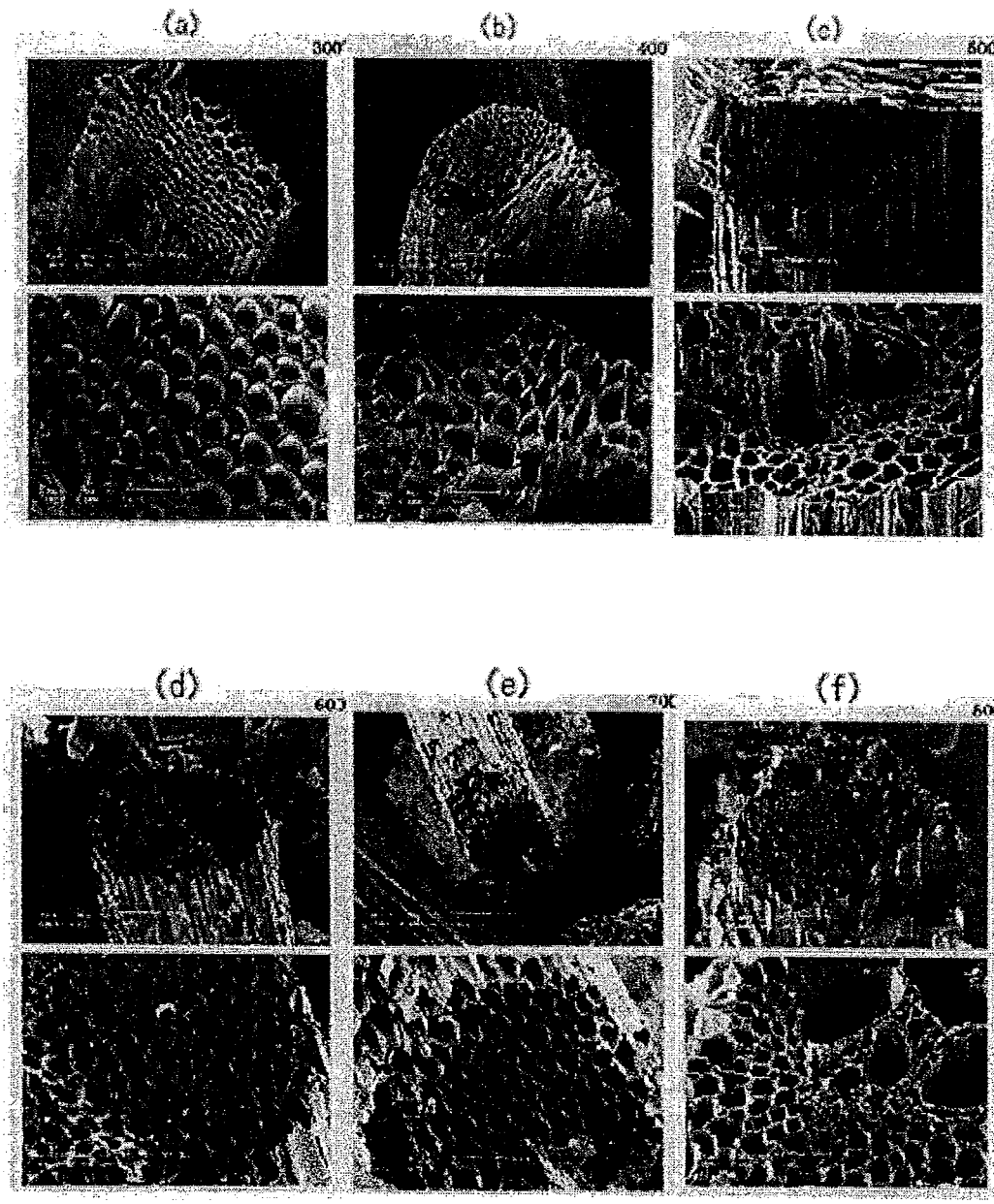

Bagasse obtained from a sugar milling factory (Mzyako island) was carbonized at 300 to 800° C. Specifically, the carbonization treatment of bagasse was performed with use of the following method and conditions. The bagasse from the factory was dried as it was under $N_2$ at 100° C. for 24 hours, thus placed under absolute dry condition. Next, this was put into a muffle furnace and under $N_2$ gas flow, the temperature was progressively raised from the room temperature to a predetermined temperature (300 to 800° C.) at a predetermined temperature rise rate of 5° C./min. After reaching the predetermined temperature, this temperature was held for 3 hours for carbonization. Thereafter, the temperature was lowered back to the room temperature by natural cooling, whereby bagasse char was obtained. Tables 1 and 2 below show the results of properties observed in the resultant bagasse char. While all of these are good chars, as may be apparent from the a, b-values, the char obtained at 300° C. or lower was found slightly different from the others in the respects of color tone, carbonization ratio (total carbon amount). However, its L*value is 30 or lower, hence, being sufficiently usable in the present invention. Further, SEM photos of the obtained chars are shown in FIG. 7. (a) shows an SEM photo of the char obtained at the carbonization temperature of 300° C. (b) is an SEM photo of the char obtained at the carbonization temperature of 400° C. (c) is an SEM photo of the char obtained at the carbonization temperature of 500° C. (d) is an SEM photo of the char obtained at the carbonization temperature of 600° C. (e) is an SEM photo of the char obtained at the carbonization temperature of 700° C. (f) is an SEM photo of the char obtained at the carbonization temperature of 800° C. It may be seen that all of these chars have good microporous condition. From the photos, it was seen that the pore sizes were approximately 10 μm. Also, the bulk specific gravities (densities) were all very low. In the examples shown in Table 2, they were not more than 96.3 (mg/cc). Hence, it was found that the chars exhibit favorable dispersion characteristics due to these microporous properties and low specific gravities. Further, it was found that the great number of micro pores had significant effect on the absorption of solar light (light). Then, the obtained bagasse chars were fine-pulverized in a blender (HB250S, from Hamilton) and then sieved through 100 mesh made of stainless steel, and the bagasse chars having particle diameters (150 μm or less) past the mesh were collected.

Figure 8:
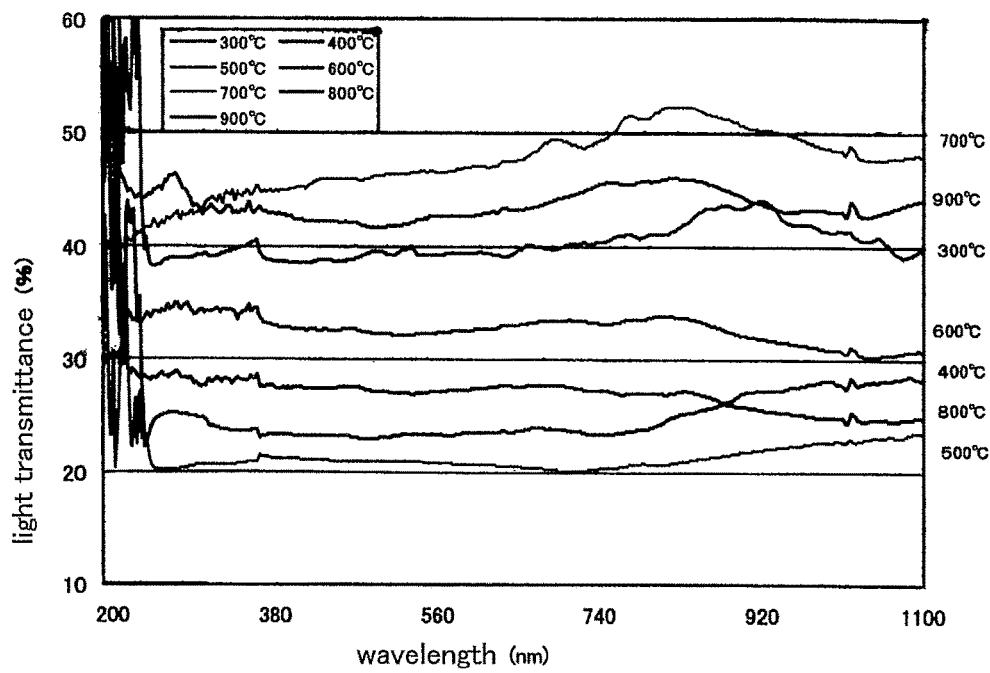
FIG. 8 is a relationship between the carbonization temperature of bagasse char and the transmittance in UV-VIS region in EXAMPLE 5.

FIG. 8 shows transmittances in the UV-visible (UV-VIS) ranges of the bagasse dispersions containing the fine particles of the above bagasse char in EG (ethylene glycol) at the content of 0.1%. Incidentally, as the control, EG per se was used. The numerals shown on the right side in the figure indicate carbonization temperatures. From them, it was found that change in the carbonization condition changes the transmittance but the wavelength does not cause significant change in the transmittance. As for the carbonization temperature, it was found that the bagasse dispersions prepared with the carbonization temperatures of 400, 500, 600 and 800° C. provide low transmittances, thus effectively absorbing the light in this range.

Incidentally, for determination of color difference, a color-difference meter (CR-300) manufactured by Minolta was employed. Bagasse char was put into a non-light transmissive plastic container and the determination was made with placing the color-difference meter in gapless contact with the bagasse char. The light employed was D65 (having a light temperature of 6500° C. and corresponding to daylight color). For the color difference representation, L*-value, a-value and b-value of CIE color system were employed. The specific bulk gravity was evaluated by JISK7365-1999 (method of obtaining an apparent density of a material that can be poured from a specified funnel: ISO 60:1977). Further, for the determination of total carbon content (TC), on dried samples before classification, $NO_2$ and $CO_2$ were measured with the combustion method (NC-90 A, Shimadzu Corporation) and from these values, the total carbon ratio and the total nitrogen ratio were calculated. In the determination of the specific surface area, sample degassed for 24 hours under vacuum was caused to adsorb $N_2$ in liquid nitrogen atmosphere and the determination was made with a specific surface area/porosimetry determining apparatus (Trister 3000, Shimadzu Corporation). The microporous structure of the bagasse char was observed by SEM. For this SEM observation, gold was coated by the standard method with using an ion coater manufactured by Shimadzu Corporation (SS-500) and then the observation was carried out. UV-VIS determination was made by the standard method with a spectral photometer manufactured by Shimadzu Corporation (UV-1600PC).

TABLE 1

| carbonization temp. | 300° C. | 400° C. | 500° C. | 600° C. | 700° C. | 800° C. |
| --- | --- | --- | --- | --- | --- | --- |
| appearance (visual judgment) | coarse particles blackish brown | coarse particles black | coarse particles black | coarse particles black | coarse particles black | coarse particles black |
| total carbon ratio TC (%) | 53.5 | 70.1 | 76.8 | 82.8 | 85.9 | 86.0 |
| specific surface area ($m^2/g$) | 1.9 | 31.8 | 214.3 | 384.2 | 394.6 | 395.5 |
| SEM photo | FIG. 7 (a) | FIG. 7 (b) | FIG. 7 (c) | FIG. 7 (d) | FIG. 7 (e) | FIG. 7 (f) |

TABLE 2

| Carbonization temp. | | 300° C. | 400° C. | 500° C. | 600° C. | 700° C. | 800° C. |
| --- | --- | --- | --- | --- | --- | --- | --- |
| color difference (CIE system) | L*value | 27.4 | 25.8 | 27.2 | 27.9 | 29.0 | 25.9 |
| | a-value | 4.18 | 1.49 | 1.74 | 1.41 | 1.21 | 0.77 |
| | b-value | 4.92 | 0.82 | −1.06 | −0.77 | −0.49 | −0.20 |
| specific bulk gravity (mg/cc) | | 81.0 | 88.7 | 77.7 | 87.5 | 86.3 | 96.3 |

Example 6

Absorption Properties Experiment (2)

Figure 9:
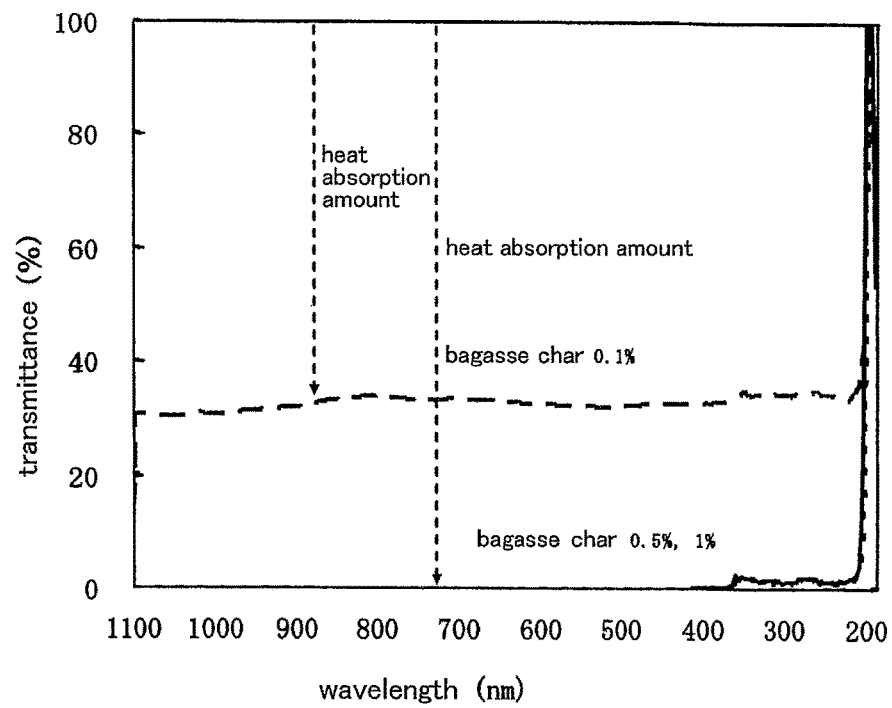
FIG. 9 is a relationship between the dispersion content of bagasse char and the transmittance in UV-VIS region in EXAMPLE 6.

A bagasse dispersion liquid was prepared by using the bagasse char made at 600° C. in EXAMPLE 5 and EG as a medium. Then, with varying the dispersion content to EG to 0.1%, 0.5%, 1%, the light transmittance in the UV-VIS range was evaluated like EXAMPLE 5. The UV-VIS determinations were made by the standard method with using spectral photometer manufactured by Shimadzu Corporation (UV-1600PC). The relationship between the bagasse char dispersion content and the transmittance in the UV-VIS region is illustrated in FIG. 9. With 0.1%, the transmittance of about 30% was exhibited in all the wavelength range. But, with dispersion contents 0.5% or higher, substantially no light transmittance was found. That is, it was found that control material having appropriate solar light transmission can be obtained by adjustment of the dispersion content of bagasse char.

Example 7

Pseudo Solar Light Absorption Experiment (2)

Figure 10:
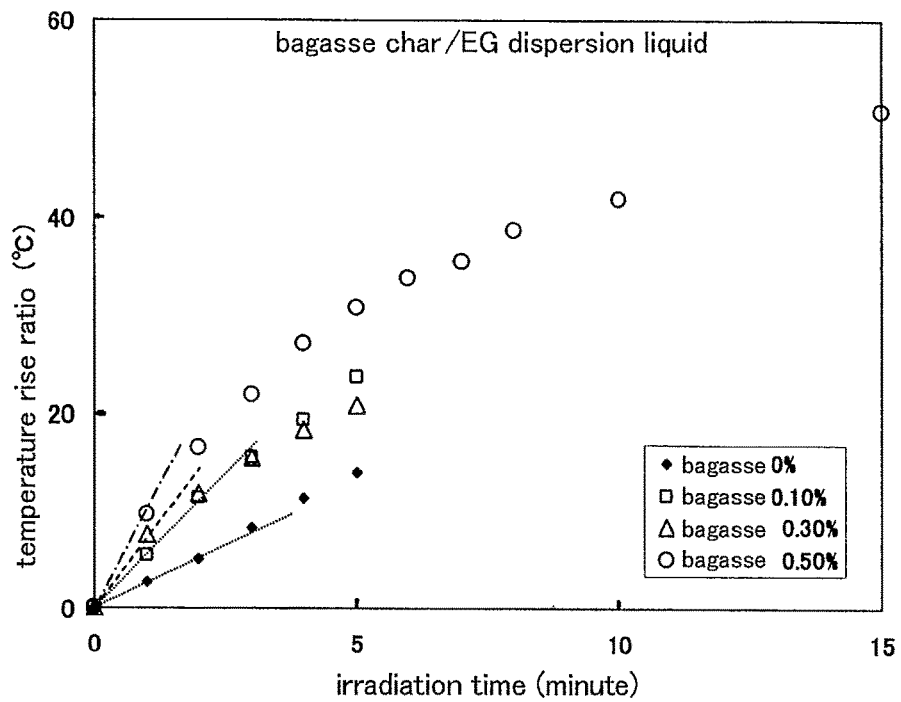
FIG. 10 is a relationship between irradiation time of pseudo solar light and the rate of temperature rise of absorption material in EXAMPLE 7.
Figure 11:
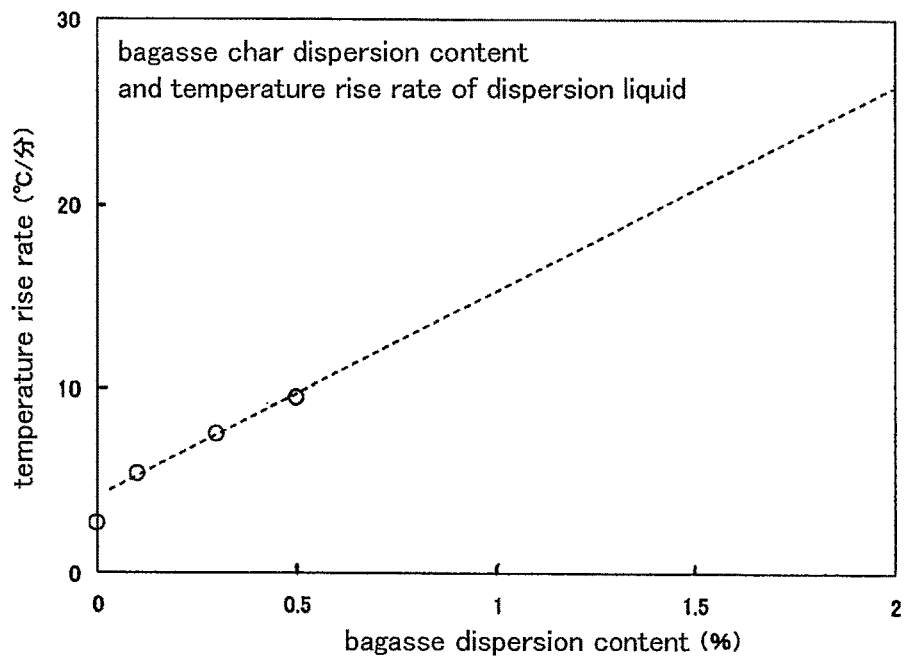
FIG. 11 is a relationship between bagasse char dispersion content and the rate of temperature rise of solar light (heat) absorption material in EXAMPLE 7.

A bagasse dispersion liquid was prepared by using the bagasse char carbonized at 600° C. of those made in EXAMPLE 5 and EG as a medium. Then, evaluation of light transmittance with the pseudo solar radiation by the same method as in EXAMPLE 2 and an experiment of temperature rise in the bagasse dispersion liquid were conducted. The light intensity of the pseudo solar light (four 500 W metal halide lamps) was adjusted to 2800 µmol/sec/$m^2$. This value corresponds to the intensity of solar light during daytime in summer of the city of Naha. The bagasse char dispersion liquid (liquid depth 5 mm) was placed between the pseudo solar light source and a sensor (photon counter) and light transmitting therethrough was determined by the sensor. In the case of absence of the bagasse char (EG only), 95% of light was transmitted. Whereas, in the case of 0.5% bagasse char dispersion, 99.97% of light was absorbed (0.03% of light was transmitted). With a similar experiment system, dispersion liquids with changing the bagasse char content to 0%, 0.1%, 0.3%, 0.5% were placed by the pseudo solar light and rise of temperature in each bagasse dispersion liquid was determined by a thermocouple. The results are shown in FIG. 10. While a certain level of temperature rise was observed even in the absence of bagasse char, with dispersion of the bagasse char, there were observed temperature rises depending on the dispersion content. Assuming a slope of intercept of temperature rise curve at the 0 minute irradiation time represents a temperature rise rate, then, in the case of 0%, the rate was 2.7° C./min; in the case of 0.1%, the rate was 5.4° C./min; in the case of 0.3%, the rate was 7.5° C./min; in the case of 0.5%, the rate was 9.5° C./min; thus showing the performance of absorbing the pseudo solar light (heat) was increased with increase of the bagasse char dispersed. This tendency is illustrated in FIG. 11. From the extrapolation values of FIG. 11, it was found that bagasse char dispersion achieves high temperature rise rates of 15° C./min with 1% dispersion and 27° C./min with 2% dispersion.

Example 8

Change in Dispersion Content of Particles

The main characterizing feature of the present invention is the ability of readily and freely changing the ability of the solar light (heat) absorption/control of the solar light (heat) absorption material through change in the addition amount of the particles to be dispersed in the medium. The light amount of pseudo solar light was varied to about 500, 1000, 1500, 2000, 3000 µmol/sec/$m^2$, and there were prepared solar light (heat) absorption materials (bagasse dispersion liquids) with varying the dispersion content of bagasse char with unit increment of 0.1% up from 0 to 0.5%. And, for the purpose of simulating lightness (Lx) inside an agricultural house with each light amount, the number of photons transmitting through the solar light (heat) absorption material (liquid depth: 5 mm) was determined, with taking sufficient care that no light may enter from beside the photon counter in the apparatus shown in FIG. 4. The results are shown in Table 3.

Figure 12:
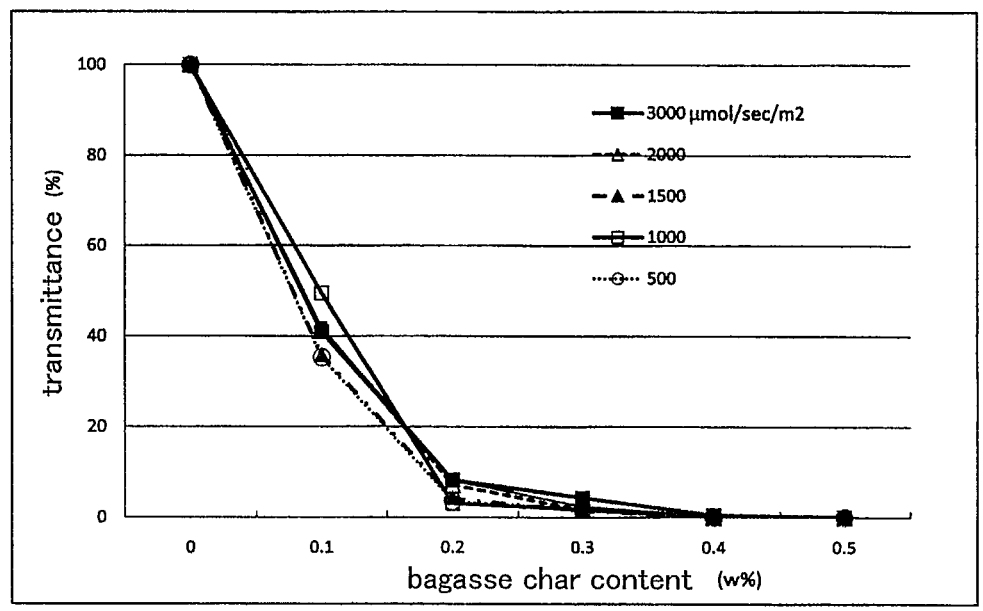
FIG. 12 is a relationship between intensity of pseudo solar light and the transmittance of solar light (heat) absorption material in EXAMPLE 8.
Figure 13:
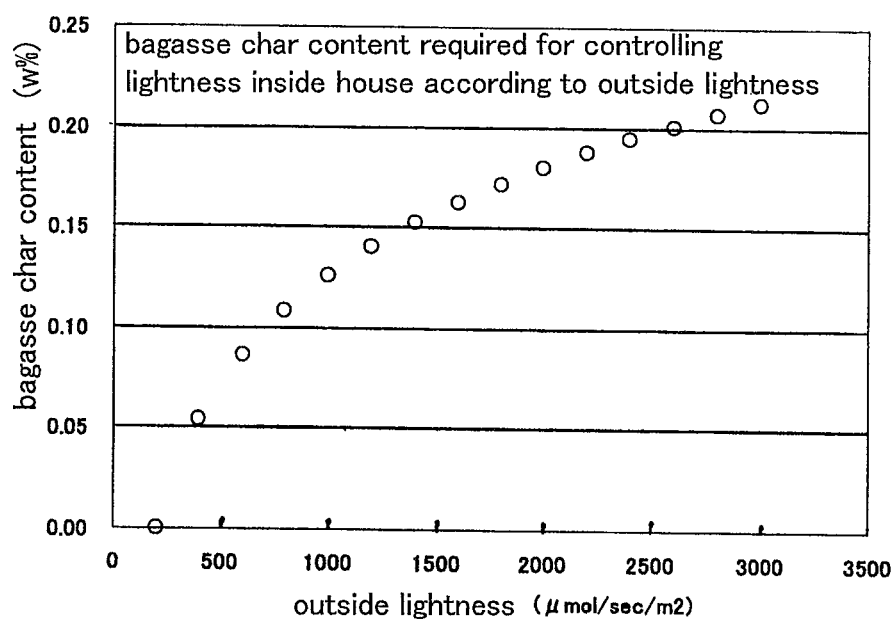
FIG. 13 is a bagasse char dispersion content required for maintaining lightness inside a house at 300 μmol/sec/m² when lightness of the outside has changed in EXAMPLE 8.

Further, lightness values and transmittance values with setting the value with bagasse char content of 0% to 100 in the data shown in Table 3 are shown in Table 4 and FIG. 12. Where there are some irregularities, there was obtained a substantially same light transmittance values-bagasse char content curve. From this, it was found that even with significant change in the light amount, the pseudo solar light (heat) absorbing performance of the bagasse char hardly changes. Further, from this curve, it can also be understood how the bagasse char content should be changed in order to allow transmission of a constantly fixed amount of solar light (heat) under varying solar light. For instance, the intensity of solar light in a day increases after sunrise and reaches maximum in midday and becomes 0 with sunset. A day in agriculture is repetition of this cycle. However, unless the strong sunbeam during midday is controlled, crops such as vegetables will not grow well. For instance, by utilizing this result, it is readily possible to maintain the intensity of solar light inside a house (e.g. 200 µmol/sec/m$^2$). FIG. 13 shows how the bagasse char dispersion content of bagasse char dispersion liquid should be changed in order to be able to control the intensity of transmitted pseudo solar light to 200 µmol/sec/m$^2$ when the pseudo solar light is varied from 0 to 3000 µmol/sec·m$^2$. For instance, when the intensity of the pseudo solar light is 500 µmol/sec/m$^2$, the bagasse char dispersion content should be about 0.06%. When the intensity of the pseudo solar light is 1500 µmol/sec/m$^2$, the bagasse char dispersion content should be about 0.15%. When the intensity of the pseudo solar light is 3000 µmol/sec/m$^2$, the bagasse char dispersion content should be about 0.21%. In this manner, even in the case of an outdoor agricultural house, the intensity of the light inside the house can be controlled constant.

TABLE 3

| pseudo solar light lightness µ mol/sec/m$^2$ | bagasse char content (w %) | | | | | |
|---|---|---|---|---|---|---|
| | 0 | 0.1 | 0.2 | 0.3 | 0.4 | 0.5 |
| 3066 | 3066.0 | 1253.7 | 251.7 | 132.3 | 16.3 | 1.3 |
| 2538 | 2538.0 | 1066.0 | 203.7 | 61.0 | 8.3 | 0.4 |
| 2020 | 2020.7 | 836.7 | 143.7 | 32.0 | 0.5 | 0.3 |
| 1518 | 1518.0 | 543.0 | 63.3 | 21.3 | 0.1 | 0.1 |
| 1016 | 1016.7 | 503.0 | 31.0 | 17.3 | 0.1 | 0.1 |
| 505 | 505.0 | 178.0 | 18.0 | 8.7 | 0.1 | 0.1 |

TABLE 4

| pseudo solar light lightness µ mol/sec/m$^2$ | bagasse char content (w %) | | | | | |
|---|---|---|---|---|---|---|
| | 0 | 0.1 | 0.2 | 0.3 | 0.4 | 0.5 |
| 3066 | 100 | 40.9 | 8.21 | 4.32 | 0.53 | 0.043 |
| 2538 | 100 | 42.0 | 8.02 | 2.40 | 0.33 | 0.016 |
| 2020 | 100 | 41.4 | 7.11 | 1.58 | 0.02 | 0.015 |
| 1518 | 100 | 35.8 | 4.17 | 1.41 | 0.01 | 0.007 |
| 1016 | 100 | 49.5 | 3.05 | 1.70 | 0.01 | 0.010 |
| 505 | 100 | 35.2 | 3.56 | 1.72 | 0.02 | 0.020 |

Example 9

Cooling Load Simulation

Figure 14:
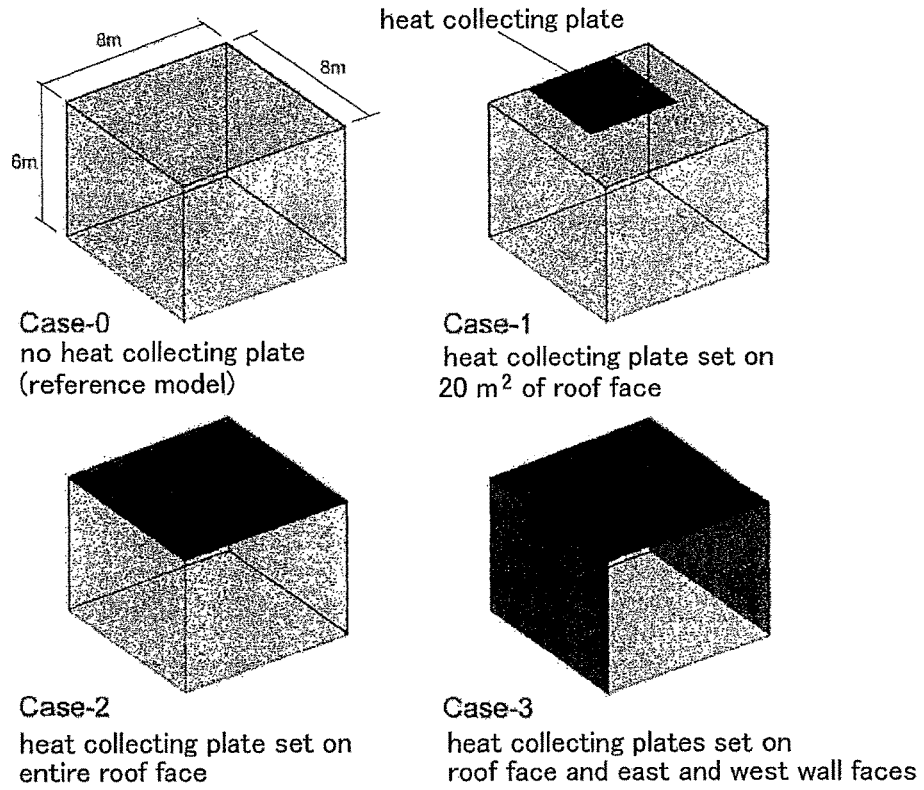
FIG. 14 is a model diagram showing an example of using the solar light (heat) absorption/control building component as a heat insulating material in a house in EXAMPLE 9.
Figure 15:
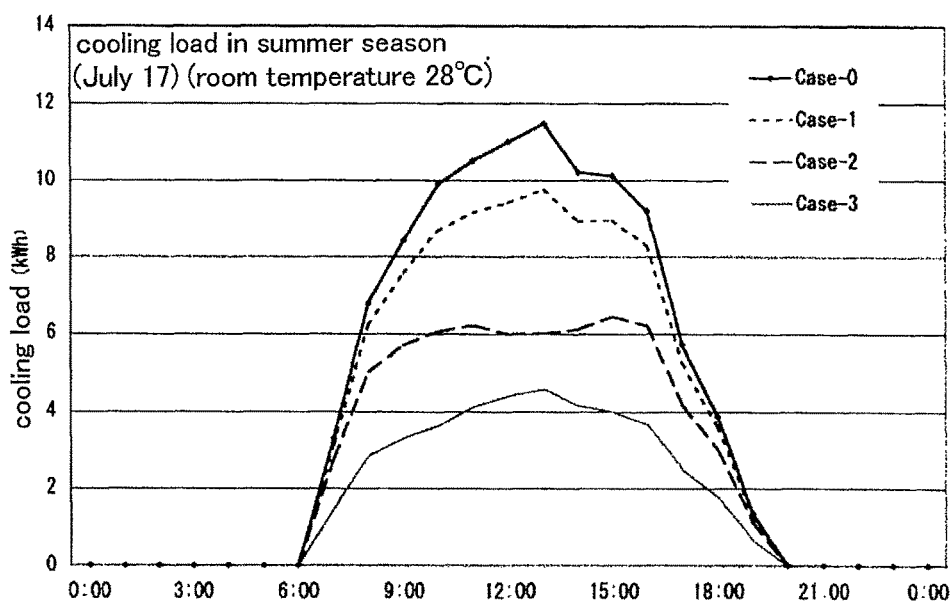
FIG. 15 is a figure of reduction in cooling load in case the solar light (heat) absorption/control building component is employed as a heat insulating material in a house in EXAMPLE 10.

Simulation experiment on change in cooling load in summer time was conducted in a standard concrete stand-alone house (building area 64 m$^2$, all two-storeys building) simulating summer time in Okinawa Prefecture, in which a solar light (heat) absorption/control building component (heat collecting plate, liquid depth 5 mm) made by using the solar light (heat) absorption material made of the 0.5% dispersion liquid of the bagasse char (600° C.) prepared in EXAMPLE 5 was installed on a roof or an exterior wall. FIG. 14 are views showing conditions of the solar light (heat) absorption/control building component on a house in Cases 0-3. For making the simulation simple, no window was provided. The results are shown in FIG. 15. Comparison example (Case 0) is the case when such solar light (heat) absorption/control material is not installed. At the midday when the sun light is strongest, power of about 11.5 kWh is needed. On the other hand, when the inventive solar light (heat) absorption/control building component was installed on a part of the roof (20 m$^2$) (Case 1), the power needed for cooling dropped to 9.7 kWh. When the inventive material was installed on the entire roof surface (64 m$^2$) (Case 2), the power needed for cooling dropped to 6 kWh. Further, when the inventive material was installed on the entire roof surface and the exterior walls (each 48 m$^2$) on the east and west sides (Case 3), the power needed for cooling dropped to about 4.6 kWh. Hence, it may be understood that when the inventive solar light (heat) absorption/control building component is installed on a roof and/or exterior wall of a stand-alone house, the cooling load can be reduced significantly.

INDUSTRIAL APPLICABILITY

With the present invention, it is possible to obtain a solar light (heat) absorption/accumulation material with simple structure, low cost, and providing a high performance, which can be used in a solar heat utilizing apparatus such as a water heater or a cooling system or power generating system. Further, the solar light (heat) absorption/control building component according to the present invention is usable in a windowpane or roofing material in a house/building or in an agricultural/horticultural facility.

DESCRIPTION OF REFERENCE MARKS 1 heat absorption/accumulation structure
2 container
3 light transmitting body
4 heat insulating material
5 heat absorption/accumulation material
10 absorption refrigerator
11 heat absorption/accumulation structure
12 heat medium pipe
13 regenerator
14 condenser
15 heat exchanger
16 absorber
17 evaporator
18 absorbent pump
19 cooling medium pump
20 cooling water pipe
21 medium
22 absorbent 23 cooling medium
30 solar light (heat) absorption/control building component
31 plate-like body
31a upper face
31b lower face
31c side face
32 solar light (heat) absorption material

The invention claimed is:

1. A solar light (heat) absorption/control building component comprising:
 a hollow portion and bagasse dispersion liquid containing particles, which have L*value of 30 or less as determined by CIE-Lab color system (light source D65), dispersed into a liquid medium having a specific heat ranging from 0.4 to 1.4 cal/g/° C. and a melting point of 5° C. or lower, the particles being carbonized bagasse having micropores, and the particles having a particle diameter from 0.01 to 1 mm and a bulk specific gravity from 0.05 to 0.2 g/ml, filled in the hollow portion of a plate-like container having an upper planar face and a lower planar face both of which have light transmission characteristics, wherein the plate-like container is configured to allow solar light radiated to the upper planar face to pass through the bagasse dispersion liquid filled in the hollow portion and subsequently to be emitted from the lower planar face;
 a detecting means for detecting an outside condition; and
 an adjusting means for adjusting the light absorbance of the bagasse dispersion liquid according to the outside condition.

2. A solar light (heat) absorption/control building component comprising:
 a hollow portion and bagasse dispersion liquid containing particles, which have L*value of 30 or less as determined by CIE-Lab color system (light source D65), dispersed into a liquid medium having a specific heat ranging from 0.4 to 1.4 cal/g/° C. and a melting point of 5° C. or lower, the particles being carbonized bagasse having micropores, and the particles having a particle diameter from 0.01 to 1 mm and a bulk specific gravity from 0.05 to 0.2 g/ml, filled in the hollow portion of a plate-like container having an upper planar face and a lower planar face both of which have light transmission characteristics, wherein the plate-like container is configured to allow solar light radiated to the upper planar face to pass through the bagasse dispersion liquid filled in the hollow portion and subsequently to be emitted from the lower planar face;
 a detecting means for detecting an outside condition;
 a tank of bagasse dispersion liquid for adjustment with particles contents thereof changed in a plurality of steps and a tank of a medium for dilution; and
 liquid feeding pumps attached to the respective tanks, the liquid feeding pumps being configured to change a flow rate of the bagasse dispersion liquid for adjustment supplied to the hollow portion and a flow rate of the medium for dilution based on the outside condition detected by the detecting means to change a dispersion content of the particles in the hollow portion.

3. The solar light (heat) absorption/control building component according to claim 1, wherein said outside condition comprises at least one of lightness and temperature.

4. A solar light (heat) absorption/control building component comprising:
 a hollow portion and bagasse dispersion liquid containing particles, which have L*value of 30 or less as determined by CIE-Lab color system (light source D65), dispersed into a liquid medium having a specific heat ranging from 0.4 to 1.4 cal/g/° C. and a melting point of 5° C. or lower, the particles being carbonized bagasse having micropores, and the particles having a particle diameter from 0.01 to 1 mm and a bulk specific gravity from 0.05 to 0.2 g/ml, wherein the bagasse dispersion liquid is filled in the hollow portion of a plate-like container having an upper planar face and a lower planar face both of which have light transmission characteristics, wherein the plate-like container is configured to allow solar light radiated to the upper planar face to pass through the bagasse dispersion liquid filled in the hollow portion and subsequently to be emitted from the lower planar face;
 a solar radiation meter for detecting a solar radiation amount;
 a tank of bagasse dispersion liquid for adjustment with particles contents thereof changed in a plurality of steps and a tank of a medium for dilution; and
 liquid feeding pumps attached to the respective tanks, the liquid feeding pumps being configured to change a flow rate of the bagasse dispersion liquid for adjustment supplied to the hollow portion and a flow rate of the medium for dilution based on the solar radiation amount detected by the solar radiation meter to change a dispersion content of the particles in the hollow portion to allow the amount of solar light after passing through the bagasse dispersion liquid filled in the hollow portion to be 300 μmol/sec/m$^2$ or less.

* * * * *